United States Patent [19]
Loftin

[11] Patent Number: 5,919,858
[45] Date of Patent: *Jul. 6, 1999

[54] ERASABLE INKS

[75] Inventor: Rachel M. Loftin, Halifax, Mass.

[73] Assignee: The Gillette Company, Boston, Mass.

[ * ] Notice: This patent is subject to a terminal disclaimer.

[21] Appl. No.: 08/821,168

[22] Filed: Mar. 21, 1997

Related U.S. Application Data

[60] Continuation of application No. 08/460,926, Jun. 5, 1995, abandoned, which is a division of application No. 08/319,927, Oct. 7, 1994, Pat. No. 5,599,853, which is a continuation of application No. 08/012,967, Jan. 29, 1993, Pat. No. 5,362,167, which is a continuation of application No. 07/809,344, Dec. 18, 1991, abandoned.

[51] Int. Cl.$^6$ .............................. C08L 9/08; C09D 11/16
[52] U.S. Cl. .................. 524/575; 523/160; 523/161; 523/164; 106/21 A; 106/20 A; 428/321.1; 428/321.3
[58] Field of Search .......................... 524/575; 523/160, 523/161, 164; 106/21 A, 20 A; 428/321.1, 321.3

[56] References Cited

U.S. PATENT DOCUMENTS

| | | |
|---|---|---|
| 3,141,187 | 7/1964 | Simon, Jr. et al. . |
| 3,266,914 | 8/1966 | Varron . |
| 3,276,870 | 10/1966 | Bitting et al. ............ 524/575 |
| 3,425,779 | 2/1969 | Fisher et al. . |
| 3,554,746 | 1/1971 | Merrill et al. . |
| 3,607,813 | 9/1971 | Purcell . |
| 3,712,871 | 1/1973 | Pasternack . |
| 3,804,774 | 4/1974 | Betts et al. . |
| 3,843,823 | 10/1974 | Seregely et al. . |
| 3,875,105 | 4/1975 | Daugherty et al. . |
| 3,886,083 | 5/1975 | Laxer . |
| 3,924,520 | 12/1975 | Boardman et al. . |
| 3,928,226 | 12/1975 | McDonough et al. . |
| 3,941,488 | 3/1976 | Maxwell . |
| 3,945,837 | 3/1976 | Miyata et al. . |
| 3,948,668 | 4/1976 | Hayek et al. . |
| 3,949,132 | 4/1976 | Seregely et al. . |
| 3,985,663 | 10/1976 | Lu et al. . |
| 3,991,032 | 11/1976 | Pace . |
| 4,015,131 | 3/1977 | McDonough et al. . |
| 4,043,820 | 8/1977 | Landan . |
| 4,059,554 | 11/1977 | Pacansky . |
| 4,069,188 | 1/1978 | Canard et al. . |
| 4,076,494 | 2/1978 | Schuster et al. . |
| 4,077,807 | 3/1978 | Kramer et al. . |
| 4,097,289 | 6/1978 | Hofmann et al. . |
| 4,097,290 | 6/1978 | Muller et al. . |
| 4,101,329 | 7/1978 | Loock . |
| 4,108,782 | 8/1978 | Thompson . |
| 4,111,878 | 9/1978 | Ruhf . |
| 4,130,691 | 12/1978 | Canard et al. . |
| 4,148,944 | 4/1979 | Ruhf . |
| 4,150,997 | 4/1979 | Hayes . |
| 4,153,593 | 5/1979 | Zabiak et al. . |
| 4,162,997 | 7/1979 | Walsh . |
| 4,186,020 | 1/1980 | Wachtel . |
| 4,221,601 | 9/1980 | Augustin et al. . |
| 4,235,981 | 11/1980 | Tunchaya . |
| 4,243,694 | 1/1981 | Mansukhani . |
| 4,248,746 | 2/1981 | Greiner . |
| 4,256,494 | 3/1981 | Yamamoto et al. . |
| 4,290,072 | 9/1981 | Mansukhani . |
| 4,297,260 | 10/1981 | Ferree, Jr. et al. . |
| 4,329,262 | 5/1982 | Muller . |
| 4,329,264 | 5/1982 | Muller . |
| 4,349,639 | 9/1982 | Muller . |
| 4,352,901 | 10/1982 | Maxwell et al. . |
| 4,357,431 | 11/1982 | Murakami et al. . |

(List continued on next page.)

FOREIGN PATENT DOCUMENTS

| | | |
|---|---|---|
| 0 042 974 A1 | 1/1982 | European Pat. Off. . |
| 0 044 378 A1 | 1/1982 | European Pat. Off. . |
| 0 100 834 | 2/1984 | European Pat. Off. . |
| 0 109 726 | 5/1984 | European Pat. Off. . |
| 0 180 402 | 5/1986 | European Pat. Off. . |
| 0 264 897 A2 | 4/1988 | European Pat. Off. . |
| 0 294 044 A1 | 12/1988 | European Pat. Off. . |
| 0 304 887 B1 | 3/1989 | European Pat. Off. . |
| 0 322 805 B1 | 7/1989 | European Pat. Off. . |
| 0 337 705 A2 | 10/1989 | European Pat. Off. . |
| 0 407 201 A1 | 1/1991 | European Pat. Off. . |
| 0 439 026 A2 | 7/1991 | European Pat. Off. . |

(List continued on next page.)

OTHER PUBLICATIONS

"Krafton—Thermoplastic Rubber Crumb" brochure.
"SeaQuill Dispensing Pens" brochure.
The American Society for Testing and Materials; "Standard Test Method for Determining the Erasability of Inked Ribbons"; ASTM; Designation; F362–85; pp. 915–916.
BASF; Technical Information—Color; "Lumogen® Yellow S 0790"; pp. 1–6; May 1985.
Dayglo® Color Corp.; Fluorescent Pigments; Technical Bulletin 2002; pp. 1–27.
Harold P. Preuss; "Pigments in Paint —Part 2—White Hiding Pigments (Section A)"; Noyes Data Corporation; pp. 1–6; 1974.

*Primary Examiner*—James J. Seidleck
*Assistant Examiner*—Olga Asinovsky
*Attorney, Agent, or Firm*—Fish & Richardson P.C.

[57] ABSTRACT

An aqueous-based erasable ink composition suitable for use in highlighters and other writing instruments includes a styrene-butadiene copolymer and a water-insoluble pigment. It preferably also includes a release agent and an antioxidant, and has a viscosity of between 10 cps and 30 cps.

16 Claims, No Drawings

U.S. PATENT DOCUMENTS

| | | |
|---|---|---|
| 4,389,499 | 6/1983 | Riesgraf . |
| 4,390,646 | 6/1983 | Ferguson . |
| 4,391,927 | 7/1983 | Farmer, III . |
| 4,407,985 | 10/1983 | Muller . |
| 4,410,643 | 10/1983 | Muller . |
| 4,471,079 | 9/1984 | Enami . |
| 4,471,879 | 9/1984 | Emond . |
| 4,520,063 | 5/1985 | Simon et al. . |
| 4,530,961 | 7/1985 | Nguyen et al. . |
| 4,545,818 | 10/1985 | Inoue et al. . |
| 4,565,576 | 1/1986 | Salgo et al. . |
| 4,606,842 | 8/1986 | Keyes et al. . |
| 4,629,748 | 12/1986 | Miyajima et al. . |
| 4,655,834 | 4/1987 | Haruta et al. . |
| 4,673,727 | 6/1987 | Miller, Jr. . |
| 4,686,246 | 8/1987 | Gajria ................................ 523/161 |
| 4,687,791 | 8/1987 | Miyajima et al. . |
| 4,721,739 | 1/1988 | Brenneman et al. . |
| 4,738,725 | 4/1988 | Daugherty et al. . |
| 4,740,549 | 4/1988 | Okuzono et al. . |
| 4,753,998 | 6/1988 | Hayes et al. . |
| 4,760,104 | 7/1988 | Miyajima et al. . |
| 4,762,875 | 8/1988 | Gold . |
| 4,765,243 | 8/1988 | Schiefer et al. . |
| 4,773,937 | 9/1988 | Schneider et al. . |
| 4,786,198 | 11/1988 | Zgambo . |
| 4,853,037 | 8/1989 | Johnson et al. . |
| 4,859,728 | 8/1989 | Schneider et al. . |
| 4,877,451 | 10/1989 | Wissik et al. . |
| 4,880,565 | 11/1989 | Rose et al. . |
| 4,889,765 | 12/1989 | Wallace . |
| 4,892,787 | 1/1990 | Kruse et al. . |
| 4,935,461 | 6/1990 | Nakamura . |
| 4,940,628 | 7/1990 | Lin et al. ........................... 523/161 |
| 4,954,174 | 9/1990 | Imagawa . |
| 4,960,464 | 10/1990 | Chen . |
| 4,963,188 | 10/1990 | Parker . |
| 4,988,123 | 1/1991 | Lin et al. . |
| 5,004,763 | 4/1991 | Imagawa . |
| 5,009,708 | 4/1991 | Grunwald et al. . |
| 5,019,166 | 5/1991 | Schwarz . |
| 5,026,755 | 6/1991 | Kveglis et al. . |
| 5,037,702 | 8/1991 | Pitts et al. . |
| 5,059,244 | 10/1991 | King et al. . |
| 5,062,891 | 11/1991 | Gruber et al. . |
| 5,062,892 | 11/1991 | Halko . |
| 5,089,050 | 2/1992 | Vieira et al. . |
| 5,091,006 | 2/1992 | Sarada et al. . |
| 5,106,416 | 4/1992 | Moffatt et al. . |
| 5,106,417 | 4/1992 | Hauser et al. . |
| 5,114,479 | 5/1992 | Keaveney et al. . |
| 5,120,359 | 6/1992 | Vzukawa et al. . |
| 5,129,947 | 7/1992 | Sharma et al. . |
| 5,131,776 | 7/1992 | Mott . |
| 5,135,569 | 8/1992 | Mathias . |
| 5,203,913 | 4/1993 | Yamamoto et al. . |
| 5,362,167 | 11/1994 | Loftin ................................ 523/161 |
| 5,629,363 | 5/1997 | Abber et al. ....................... 523/161 |
| 5,763,525 | 6/1998 | Abber et al. ....................... 524/575 |

FOREIGN PATENT DOCUMENTS

| | | |
|---|---|---|
| 834 459 | 5/1978 | Germany . |
| 835 006 | 10/1978 | Germany . |
| 2914913 | 10/1980 | Germany . |
| 54-61369 | 4/1954 | Japan . |
| 51-74708 | 12/1974 | Japan . |
| 52-134507 | 5/1976 | Japan . |
| 55-152768 | 11/1980 | Japan . |
| 82-59147 | 7/1982 | Japan . |
| 57-135878 | 8/1982 | Japan . |
| 59-1425 | 5/1983 | Japan . |
| 045374 | 9/1983 | Japan . |
| 83-152069 | 9/1983 | Japan . |
| 83-176281 | 10/1983 | Japan . |
| 120667 | 7/1984 | Japan . |
| 60-203681 | 10/1985 | Japan . |
| 62-101672 | 10/1985 | Japan . |
| 63-163466 | 12/1986 | Japan . |
| 63-210181 | 2/1987 | Japan . |
| 2-28273 | 7/1988 | Japan . |
| 2-169678 | 12/1988 | Japan . |
| 2-209973 | 2/1989 | Japan . |
| 1-174577 | 7/1989 | Japan . |
| 3-52505 | 7/1989 | Japan . |
| 033406 | 10/1991 | Japan . |
| 052109 | 11/1991 | Japan . |
| 62265374 | 8/1992 | Japan . |
| 065078 | 10/1993 | Japan . |
| 229475 | 10/1994 | Japan . |
| 1347262 | 6/1969 | United Kingdom . |
| WO/88/00961 | 2/1988 | WIPO . |

ERASABLE INKS

This is a continuation of application Ser. No. 08/460,926 filed on Jun. 5, 1995 by Rachel M. Loftin for ERASABLE INKS now abandoned, which in turn is a divisional of application Ser. No. 08/319,927, filed Oct. 7, 1994 now U.S. Pat. No. 5,599,853, which in turn is a continuation of application Ser. No. 08/012,967, filed Jan. 29, 1993, now U.S. Pat. No. 5,362,167, issued Nov. 8, 1994, which in turn is a continuation of application Ser. No. 07/809,344, filed Dec. 18, 1991 now abandoned.

BACKGROUND OF THE INVENTION

The invention relates to aqueous-based erasable inks.

Aqueous-based erasable inks typically include a film-forming elastomeric polymer and colorant dispersed in water. When the inks are applied to paper, the water evaporates and the polymer provides a coalesced residue on the surface of the paper. The inks are erasable in that the residue can be removed from the paper surface for some period of time after formation without leaving a visible residue or damaging the paper.

SUMMARY OF THE INVENTION

In one aspect, the invention features a pen including a body, a writing tip at one end of the body, a reservoir included within the body, and an aqueous-based, erasable marking composition having a viscosity of between 10 cps and 30 cps (preferably between 10 cps and 20 cps) within the reservoir. The marking composition includes a latex emulsion (a rubber dispersed in water) and a water insoluble colorant, preferably a fluorescent pigment like those commonly used in highlighters. In a preferred embodiment, the pen is a marker, having a porous tip, and the marking composition is delivered to the tip by capillary action.

Preferred compositions for use in the marker include a release agent (preferably a silicone), an anti-oxidant (preferably a cresol), and a latex with a rubber solids content of between 20% and 40% and a viscosity of less than 50 cps (more preferably less than 40 cps). The composition preferably includes between about 60% and 90% (most preferably 70% and 80%) of the latex by weight. The preferred latexes include a polystyrene-butadiene copolymer having a Mooney value of at least 90.

In another aspect, the invention features an aqueous-based, erasable marking composition that includes a a styrene-butadiene copolymer having a Mooney value of greater than 100.

In another aspect, the invention features an aqueous-based, erasable marking composition that includes a styrene-butadiene copolymer, a water insoluble colorant, and a release agent.

In another aspect, the invention features an aqueous-based, erasable marking composition that includes a styrene/butadiene copolymer, a water-insoluble colorant, and an anti-oxidant.

In another aspect, the invention features an aqueous-based, erasable marking composition that includes a styrene/butadiene copolymer, a water-insoluble colorant, and sufficient water that the viscosity of the composition (at room temperature) is between about 10 cps and 30 cps, preferably between about 10 cps and 20 cps.

The erasable inks of the invention provide markings that can be readily removed from paper for a lengthy period of time (more than a year) after the ink is applied, without damaging the paper or leaving a visible residue. The inks are storage-stable, easy to manufacture, and easy to apply. The inks preferably have a low viscosity and as a result are particularly suitable for use with standard felt-tip markers that rely on a capillary feed system to draw ink from a reservoir. Thus, the inks are suitable for use in markers, which typically use fluorescent-colored pigments. One significant advantage to using the inks in markers is that when textbook pages are highlighted by a student, the highlighted portions can be erased a year later when the book is given or sold to a different student.

Other features and advantages of the invention will be apparent from the Description of the Preferred Embodiments thereof, and from the claims.

DESCRIPTION OF THE PREFERRED EMBODIMENT

The preferred compositions include a styrene/butadiene copolymer, a water-insoluble colorant, a release agent, an anti-oxidant, and water.

The styrene/butadiene copolymer is the film-forming material in the composition. The preferred copolymers are unsubstituted, i.e., they lack chemical groups such as carboxyl, sulfonyl, or amino groups, and have a high modulus of elasticity. The preferred copolymers have a Mooney viscosity of greater than 90, preferably greater than 100. Copolymers with a high Mooney value are preferred because generally they tend to be less crumbly on the paper once the water evaporates, and have a greater rub resistance.

The preferred copolymers have a styrene:butadiene ratio of between 10:90 and 35:65, more preferably between 20:80 and 30:70. In general, the higher the styrene content, the more erasable the ink. If the styrene content is lower than 10%, the erasability of the ink tends to deteriorate. If the styrene content is greater than 35%, the inks may have an undesirably high viscosity.

The preferred copolymers are available as latex emulsions from Goodyear Chemicals of Akron, Ohio under the tradename PLIOLITE. The emulsion has a solids content of 30–50% and a Brookfield viscosity (25° C.) of less than about 50 cps, more preferably about 30 cps or less. The viscosity of the latex preferably is less than 50 cps, more preferably less than 40 cps. Normally, the ink compositions will include between 60% and 90%, more preferably between about 70% and 80%, of the emulsion by weight. Typically, the composition should include between about 20% and 40% of solid rubber by weight. The most preferred latex emulsion is PLIOLITE LPF-2108.

The preferred colorants are fine grain sized, organic or inorganic pigments or dyes that are insoluble in water. Examples of suitable pigments include carbon blacks and prussian blues; suitable dyes include those that are nitro- or anthroquinone-based. The amount of colorant can vary but usually will not exceed about 5% of the composition by weight. The preferred colorants have a particle size of less than 3 $\mu$m.

The more preferred colorants are fluorescent pigments that provide a vibrant, read-through, erasable tracing and which can be photocopied without observing the highlighted material. The especially preferred read-through tracings are provided by including from about 3% to 5% by weight of the fluorescent pigment. Examples of suitable fluorescent pigments include the Day-Glo pigments available from the Day-Glo Color Corp. of Cleveland, Ohio and "Lumikol", from Nippon Keiko Kagaku LTD.

The release agents used in the composition provide a film between the paper surface and the marking, which may be liquid, semi-solid or solid. This film aids in lifting the marking from the surface by a rubbing action with an elastomeric eraser, providing substantially complete removal of the marking from the surface without significant detectable damage to the surface. Preferred release agents include water dispersible silicone oils or silicone surfactants. Especially preferred release agents include combinations of silicone oils and silicone surfactants and particularly combinations of glycol polysiloxanes and silicone glycol copolymers. Normally, amounts of release agents between about 1 to about 10 percent by weight are suitable; for the more preferred release agents amounts between about 4 to about 8 percent by weight are suitable.

The anti-oxidant inhibits the oxidation, and resultant cross-linking, of the styrene/butadiene copolymer. Cross-linking is undesirable because it adversely effects the erasability performance characteristics of the ink, particularly after the inks have been exposed to direct sunlight for a significant period of time. Especially preferred are rubber antioxidants, in particular 4,4'-thiobis (6-tert-butyl-m-cresol) and 4,4'-butylidenebis (6-tert-butyl-m-cresol). Amounts of rubber antioxidant between about 1 to about 2 percent by weight of the rubber solids are normally suitable.

The compositions can include other conventional ingredients. For example, emulsifying agents such as fatty acids (preferably fatty acid diethanolamides) are normally included in the ink in amounts between about 0.3 to about 1 percent by weight to thoroughly disperse the colorant and release agent in the aqueous phase. Dispersing agents also may be included particularly to help disperse the anti-oxidant.

Sufficient water should be included in the composition so that its Brookfield viscosity (25° C.) is less than about 30 cps, more preferably between about 10 cps and 20 cps. If the viscosity is too low, the ink will tend to absorb into the paper, making erasability difficult. If the viscosity is too high, the compositions may be too thick for practical use, particularly in capillary feed systems.

The compositions generally can be prepared by blending the ingredients under conditions of high shear. The following examples illustrate the invention. Of these examples, the most preferred compositions are those described in Examples 8, 10, 15 and 17.

Example 1

| Ingredient | % by weight |
| --- | --- |
| Dispers blue[1] | 6% |
| Silicone oil[2] | 2% |
| Dow Corning 193[3] | 2% |
| Clindrol 200-0[4] | 1% |
| Santicizer 8[5] | 1% |
| LPF 2108[6] | 70% |
| Water | 18% |

1. A partially aqueous dispersion of blue pigment (copper phthalocyanine) including about 35% by weight pigment and sold under the Tradename Dispers blue 69-0007 by BASF.
2. A release agent; available by Ruger Chem. Co.
3. A silicone surfactant; available from Dow Chemical Co.
4. An emulsifier; available from Clintwood Chemical Co.
5. A plasticizer availabe from Monsanto Co.
6. The latex. A styrene/butadiene emulsion having a styrene:butadiene ratio of about 29:71, a total solid concentration of about 40%, and a Mooney viscosity of greater than 100. Sold by Goodyear Tire and Rubber Co. under the Tradename Pliolite SBR Latex Product No. LPF-2108.

Example 2

| Ingredient | % by weight |
| --- | --- |
| Dispers Black[7] | 10% |
| Dow Corning 472[8] | 1% |
| LPF-2108 | 80% |
| Water | 9% |

7. A partially agenous dispersion of carbon black including about 35% by weight carbon black and sold by BASF.
8. The release agent; a water dispersible glycol polysiloxane sold by Dow Chemical Co.

Example 3

| Ingredient | % by weight |
| --- | --- |
| Lucony red 3870[9] | 5% |
| Lucony red 3550[9] | 5% |
| Ethfac 391[10] | 1% |
| LPF-2108 | 80% |
| Water | 5% |

9. A partially soluble aqueous dispersion of a red pigment, including about 35% by weight pigment, and sold by BASF.
10. An emulsifer; a phosphate ester sold by Ethox Chemical Co.

Example 4

| Ingredient | % by weight |
| --- | --- |
| Dispers black | 6% |
| Santowhite Antioxidant[11] | 0.56% |
| Clindrol 200-0 | 0.44% |
| Dow Corning 193 | 5% |
| LPF 2108 | 70% |
| Water | 18% |

11. Sold by Monsanto Chemical Co.

| Ingredient | % by weight |
|---|---|
| Example 5 | |
| Dispers black | 6% |
| Santowhite Antioxidant | 0.56% |
| Clindrol 200-0 | 0.44% |
| DOW CORNING 193 | 2% |
| Silicone fluid | 3% |
| LPF 2108 | 70% |
| Water | 18% |
| Example 6 | |
| Lumikol Pink Dispersion[12] | 25% |
| Silicone oil | 2% |
| DOW CORNING 193 | 2% |
| Clindrol 200-0 | 1% |
| LPF 2108 | 70% |

12. A fluorescent pigment dispersion containing about 25% by weight of pigment; available from Nippon Keiko Kagaku LTD.

| Ingredient | % by weight |
|---|---|
| Example 7 | |
| Dispers blue | 5% |
| Water | 20% |
| Silicone oil | 2% |
| Dow Corning 193 | 2% |
| Clindrol 200-0 | 1% |
| LPF 2108 | 70% |
| Example 8 | |
| Lumikol pink dispersion | 25% |
| Silicone oil | 2% |
| DOW CORNING 193 | 2% |
| Clindrol 200-0 | 1% |
| Santowhite antioxidant | 0.5% |
| LPF 2108 | 69.5% |
| Example 9 | |
| Dispers blue | 5% |
| Water | 19.5% |
| Silicone oil | 2% |
| Dow Corning 193 | 2% |
| Clindrol 200-0 | 1% |
| LPF 2108 | 70% |
| Santowhite antioxidant | 0.5% |
| Example 10 | |
| Lumikol Yellow Dispersion[13] | 25% |
| Silicone oil | 2% |
| Dow Corning 193 | 2% |
| Clindrol 200-0 | 1% |
| Ethanox 322[14] | 0.5% |
| LPF 2108 | 69.5% |

13. A fluorescent pigment dispersion containing about 25% by weight pigment; availabe from Nippon Keiko Kagaku LTD.
14. A preferred anti-oxidant, available from Monsanto Chemical Co.

| Ingredient | % by weight |
|---|---|
| Example 11 | |
| Lumikol Pink Dispersion | 25% |
| Dow Corning 193 | 3% |
| LPF 2108 | 55% |
| Water | 16% |
| Clindrol 200-0 | 1% |
| Example 12 | |
| LPF 2108 | 55% |
| Clindrol 200-0 | 1% |
| Dow Corning 193 | 2% |
| Water | 14% |
| Lumikol NKW 3003[15] | 25% |
| Drying Agent[16] | 3% |

15. A red fluorescent pigment available from Nippon Keiko Kagaku LTD.
16. Either Dowanol DB or EB; available from Dow Chemical Co.

| Ingredient | % by weight |
|---|---|
| Example 13 | |
| LPF 2108 | 40% |
| Propylene glycol[17] | 20% |
| Lumikol green[18] | 20% |
| White[19] | 5% |
| Water | 15% |

17. An anti-drying agent.
18. A green fluorescent pigment available from Nippon Keiko Kagaku LTD.
19. A white pigment available from BASF.

| Ingredient | % by weight |
|---|---|
| Example 14 | |
| Ethanox 322 | 0.56% |
| Paraplex WP-1[20] | 0.44% |
| Silicone fluid | 3.33% |
| Dow Corning 193 | 2.67% |
| LPF 2108 | 70% |
| DWB-M 601[21] | 6% |
| Water | 17% |

20. A plasticizer available from Rohm-Haas Chemical Co.
21. Blue pigment dispersion available from Nikko Bics LTD.

| Ingredient | % by weight |
|---|---|
| Example 13 | |
| Anti-oxidant[22] | 2% |
| Clindrol 200-0 | 1% |
| Dow Corning 193 | 3% |
| Lumikol NKW 3007 | 24% |
| LPF 2108 | 70% |

22. Either Naugard SP antioxidant or Naugawhite antioxidant. Both are phenols available from Uniroyal.

| Ingredient | % by weight |
|---|---|
| Example 16 | |
| Dispers blue | 5% |
| Dow Corning 193 | 3% |

-continued

| Ingredient | % by weight |
|---|---|
| Clindrol 200-0 | 1% |
| Propylene glycol | 1% |
| Water | 19.5% |
| Santowhite antioxidant | 0.5% |
| LPF 2108 | 70% |
| Example 17 | |
| Lumikol NKW 3007 | 25% |
| Dow Corning 193 | 3% |
| Clindrol 200-0 | 1% |
| Santowhite anitoxidant | 0.5% |
| Water | 1.5% |
| LPF 2108 | 69% |

The preferred inks can be used in conventional capillary feed markers that preferably include a polyester fiber tip (or nib) connected to an ink reservoir, preferably also made of polyester fiber. Other types of nibs (e.g., acrylonitrile fibers) and reservoirs (e.g., polyethylene fibers and cellulose acetate fibers) can be used. The reservoir is surrounded by, e.g., a polypropylene barrel, and is capped at the end opposite the nib with, e.g., a polypropylene plug; the marker also includes a polypropylene cap for covering the nib. The reservoirs are available from, e.g., American Filtrona Co. of Richmond, Va., or Baumgartner. The nibs are available from e.g., Aubex Co. of Tokyo, Japan, Teibow or Porex. During use, because the ink has a relatively low viscosity, the ink is drawn from the reservoir by the tip by capillary action. Passages from, for example, a textbook can be highlighted with the inks, which provide a uniform, transparent covering over the passage. The inks are erasable when applied.

The most preferred composition exhibit erasability characteristics that do not appreciably deteriorate for lengthy periods of time (at least a year). Compositions can be tested for such properties by making a mark on standard 60 lb. offset printing paper and exposing the mark to six hours of sunlight for six consecutive days. The most preferred compositions exhibit approximately the same ease of erasability of the mark using a standard Pink Pearl eraser, (available from Eberhard Faber) after seven days as two hours after application.

Other embodiments are within the claims. For example, the marking composition of the invention may be used in other types of writing instruments, e.g. ball-point pens, and in other suitable applications, e.g. bottle and brush ink dispensers.

I claim:

1. An aqueous-based marking ink, comprising water, a colorant, and a latex emulsion comprising a styrene-butadiene copolymer having a styrene content of less than about 35%, said ink being non-shear thinning and erasable from 60 lb. offset printing paper.

2. An aqueous-based marking ink of claim 1, wherein said colorant is a fluorescent colorant.

3. An aqueous-based marking ink of claim 1 wherein said latex emulsion has a viscosity of less than about 50 cps.

4. An aqueous-based marking ink of claim 1 wherein said ink has a viscosity of from about 10 to 30 cps.

5. An aqueous-based marking ink of claim 1 wherein said ink further comprises a release agent.

6. An aqueous-based marking ink of claim 1 wherein said ink further comprises an antioxidant.

7. An aqueous-based marking ink of claim 1, wherein said ink is capable of forming a read-through tracing on 60 lb. offset printing paper.

8. The aqueous-based marking ink of claim 1 wherein said copolymer has a styrene:butadiene ratio of between 10:90 and 35:65.

9. The aqueous-based marking ink of claim 1 wherein said ink has a styrene-butadiene copolymer solids content less than 50% by weight.

10. The aqueous-based marking ink of claim 1 wherein said ink has a styrene-butadiene copolymer solids content between 10% and 40% by weight.

11. The aqueous-based marking ink of claim 1 wherein said styrene-butadiene copolymer has a Mooney value of at least 90.

12. The composition of claim 8 wherein said release agent is a silicone.

13. The composition of claim 1 further comprising an antioxidant.

14. The composition of claim 1 wherein said colorant is a fluorescent pigment.

15. The composition of claim 13 wherein said antioxidant is a cresol.

16. The composition of claim 13 wherein the composition contains a sufficient quantity of water that the viscosity of the composition is between 10 cps and 30 cps.

* * * * *

UNITED STATES PATENT AND TRADEMARK OFFICE
CERTIFICATE OF CORRECTION

PATENT NO. : 5,919,858
DATED : July 6, 1999
INVENTOR(S) : Rachel M. Loftin

It is certified that error appears in the above-identified patent and that said Letters Patent is hereby corrected as shown below:

<u>Title page,</u>
References cited, 3,843,823 10/1974 Seregely et al ............
    delete "10/1974" and insert -- 9/1974 --

4,256,494 3/1981 Yamamoto et al ..........
    delete "3/1981" and insert -- 5/1981 --

Other publications,

Krafton – Thermoplastic Rubber Crumb ...........
    Delete "Krafton" and insert -- Kraton --

Signed and Sealed this

Eleventh Day of September, 2001

Attest:

NICHOLAS P. GODICI
Attesting Officer     Acting Director of the United States Patent and Trademark Office